United States Patent
Slowiak et al.

(10) Patent No.: US 12,231,428 B2
(45) Date of Patent: *Feb. 18, 2025

(54) DIGITAL IDENTITY STEP-UP

(71) Applicant: Early Warning Services, LLC, Scottsdale, AZ (US)

(72) Inventors: Gregory Slowiak, Chicago, IL (US); Eric Woodward, San Francisco, CA (US); Philip Lam, San Francisco, CA (US); Jeff Shultz, Waco, TX (US)

(73) Assignee: Early Warning Services, LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/396,358

(22) Filed: Dec. 26, 2023

(65) Prior Publication Data

US 2024/0129311 A1  Apr. 18, 2024

Related U.S. Application Data

(63) Continuation of application No. 16/908,456, filed on Jun. 22, 2020, now Pat. No. 11,888,849.

(Continued)

(51) Int. Cl.
*H04L 29/06* (2006.01)
*G06F 9/445* (2018.01)
(Continued)

(52) U.S. Cl.
CPC .......... *H04L 63/0884* (2013.01); *G06F 9/445* (2013.01); *G06V 40/172* (2022.01)

(58) Field of Classification Search
CPC .... H04L 63/0884; G06F 9/445; G06V 40/172
See application file for complete search history.

(56) References Cited

U.S. PATENT DOCUMENTS 7,912,971 B1    3/2011  Dunn
8,843,997 B1 *  9/2014  Hare .................. H04L 63/0815
                                                            709/200

(Continued)

FOREIGN PATENT DOCUMENTS

CA    3074350 A1    9/2020
EP    2867814 A1    5/2015
WO    2019118682 A1 6/2019

OTHER PUBLICATIONS

U.S. Appl. No. 16/908,435, Non-Final Office Action, Mailed On Nov. 2, 2021, 14 pages.

(Continued)

*Primary Examiner* — William A Corum, Jr.
(74) *Attorney, Agent, or Firm* — Kilpatrick Townsend & Stockton LLP

(57) ABSTRACT

Described herein is an identity network for validating the digital identity of a user. The identity network may receive, from a relying party, an identity validation request to validate a digital identity of the user. The identity network may provide, to the relying party, a link associated with an identity provider application based on the identity validation request. The identity network may receive, from an identity provider associated with the identity provider application, a confirmation that the user has successfully accessed the identity provider application via the link. After receiving the confirmation, the identity network may receive from the identity provider, an attribute validation request to validate identity attributes of the user, where the attribute validation request includes a plurality of identity attributes of the user. The identity network may validate the digital identity of the user based on the plurality of identity attributes.

20 Claims, 6 Drawing Sheets

Related U.S. Application Data

(60) Provisional application No. 62/864,889, filed on Jun. 21, 2019, provisional application No. 62/864,906, filed on Jun. 21, 2019, provisional application No. 62/864,900, filed on Jun. 21, 2019, provisional application No. 62/864,891, filed on Jun. 21, 2019, provisional application No. 62/864,911, filed on Jun. 21, 2019.

(51) Int. Cl.
*G06V 40/16* (2022.01)
*H04L 9/40* (2022.01)

(56) References Cited

U.S. PATENT DOCUMENTS

| | | |
|---|---|---|
| 10,069,811 B2 | 9/2018 | Curtis et al. |
| 10,237,259 B2 | 3/2019 | Ronda et al. |
| 10,255,598 B1 | 4/2019 | Dean et al. |
| 10,853,791 B1 | 12/2020 | Ellis et al. |
| 11,157,954 B1 | 10/2021 | Belanger et al. |
| 11,244,034 B1 | 2/2022 | Nagappan et al. |
| 11,328,356 B1 | 5/2022 | Slowiak et al. |
| 11,394,724 B1 | 7/2022 | Slowiak et al. |
| 11,438,331 B1 | 9/2022 | Slowiak et al. |
| 11,522,701 B2 | 12/2022 | Rowe et al. |
| 11,784,995 B1 | 10/2023 | Slowiak et al. |
| 11,816,728 B2 | 11/2023 | Slowiak et al. |
| 11,830,066 B2 | 11/2023 | Slowiak et al. |
| 11,847,694 B2 | 12/2023 | Slowiak et al. |
| 11,888,849 B1 | 1/2024 | Slowiak et al. |
| 11,900,453 B2 | 2/2024 | Slowiak et al. |
| 11,941,093 B2 | 3/2024 | Slowiak et al. |
| 2004/0236965 A1 | 11/2004 | Krohn |
| 2006/0129816 A1 | 6/2006 | Hinton |
| 2009/0133107 A1 | 5/2009 | Thoursie |
| 2010/0145861 A1 | 6/2010 | Law et al. |
| 2010/0154046 A1 | 6/2010 | Liu et al. |
| 2013/0036456 A1 | 2/2013 | Boysen et al. |
| 2013/0086657 A1 | 4/2013 | Srinivasan et al. |
| 2014/0173754 A1 | 6/2014 | Barbir |
| 2014/0359741 A1 | 12/2014 | Kistner et al. |
| 2015/0058930 A1 | 2/2015 | Mitchell et al. |
| 2015/0332029 A1 | 11/2015 | Coxe et al. |
| 2017/0041296 A1 | 2/2017 | Ford et al. |
| 2017/0140174 A1 | 5/2017 | Lacey et al. |
| 2017/0186084 A1 | 6/2017 | Koch |
| 2017/0244676 A1 | 8/2017 | Edwards |
| 2017/0250972 A1 | 8/2017 | Ronda et al. |
| 2017/0257358 A1 | 9/2017 | Ebrahimi et al. |
| 2018/0145979 A1 | 5/2018 | Lu et al. |
| 2018/0152440 A1 | 5/2018 | Hande et al. |
| 2018/0181745 A1 | 6/2018 | Chen et al. |
| 2018/0197263 A1 | 7/2018 | Pearson et al. |
| 2018/0218121 A1 | 8/2018 | Gassner et al. |
| 2018/0219846 A1 | 8/2018 | Poschel et al. |
| 2018/0267847 A1 | 9/2018 | Smith et al. |
| 2018/0342018 A1 | 11/2018 | Pancholi et al. |
| 2018/0349581 A1 | 12/2018 | Ramalingam |
| 2019/0182042 A1 | 6/2019 | Ebrahimi et al. |
| 2019/0261169 A1 | 8/2019 | Kamal et al. |
| 2020/0153814 A1 | 5/2020 | Smolny et al. |
| 2020/0213297 A1 | 7/2020 | Suraparaju |
| 2020/0366671 A1 | 11/2020 | Larson et al. |
| 2021/0014218 A1 | 1/2021 | Kurylko et al. |
| 2021/0099454 A1 | 4/2021 | Rahimi et al. |
| 2021/0165865 A1 | 6/2021 | Trelin |
| 2021/0320799 A1 | 10/2021 | Bankston |
| 2021/0326426 A1 | 10/2021 | Bouse |
| 2022/0029985 A1 | 1/2022 | Malhotra et al. |
| 2022/0301050 A1 | 9/2022 | Slowiak et al. |

OTHER PUBLICATIONS

U.S. Appl. No. 16/908,435 , Notice of Allowance, Mailed On Mar. 17, 2022, 7 pages.
U.S. Appl. No. 16/908,443 , Advisory Action, Mailed On Nov. 25, 2022, 4 pages.
U.S. Appl. No. 16/908,443 , Final Office Action, Mailed On Jul. 7, 2022, 15 pages.
U.S. Appl. No. 16/908,443 , Non-Final Office Action, Mailed On Nov. 9, 2021, 14 pages.
U.S. Appl. No. 16/908,443 , Notice of Allowance, Mailed On Jun. 1, 2023, 12 pages.
U.S. Appl. No. 16/908,453 , Notice of Allowance, Mailed On May 11, 2022, 9 pages.
U.S. Appl. No. 16/908,456 , Advisory Action, Mailed On Apr. 14, 2023, 4 pages.
U.S. Appl. No. 16/908,456 , Final Office Action, Mailed On Feb. 6, 2023, 13 pages.
U.S. Appl. No. 16/908,456 , Non-Final Office Action, Mailed On Oct. 14, 2022, 12 pages.
U.S. Appl. No. 16/908,456 , Non-Final Office Action, Mailed On Jun. 26, 2023, 15 pages.
U.S. Appl. No. 16/908,456 , Notice of Allowance, Mailed On Sep. 19, 2023, 19 pages.
U.S. Appl. No. 16/908,460 , Notice of Allowance, Mailed On Jan. 12, 2022, 10 pages.
U.S. Appl. No. 17/716,516 , Notice of Allowance, Mailed On Aug. 2, 2023, 10 pages.
U.S. Appl. No. 17/855,971 , Non-Final Office Action, Mailed On Feb. 15, 2023, 13 pages.
U.S. Appl. No. 17/855,971 , Notice of Allowance, Mailed On Jul. 7, 2023, 7 pages.
U.S. Appl. No. 17/856,056 , Non-Final Office Action, Mailed On Feb. 15, 2023, 14 pages.
U.S. Appl. No. 17/856,056 , Notice of Allowance, Mailed On Jul. 24, 2023, 8 pages.
U.S. Appl. No. 17/900,435 , Notice of Allowance, Mailed On Nov. 22, 2023, 9 pages.
U.S. Appl. No. 17/900,441 , Notice of Allowance, Mailed On Oct. 2, 2023, 9 pages.
Goswami et al., "A Replay Attack Resilient System for PKI Based Authentication in Challenge-Response Mode for Online Application", 3rd International Conference on Eco-friendly Computing and Communication Systems, Dec. 21, 2014, pp. 144-148.
Vassilev et al., "Personal Brokerage of Web Service Access", Institute of Electrical and Electronics Engineers Security and Privacy Magazine, vol. 5, No. 5, Oct. 1, 2007, pp. 24-31.

\* cited by examiner

DIGITAL IDENTITY STEP-UP

RELATED APPLICATIONS

This application is a continuation of U.S. non-provisional patent application Ser. No. 16/908,456, filed on Jun. 22, 2020, entitled "DIGITAL IDENTITY STEP-UP," which claims the benefit of and priority to, pursuant to 35 USC § 119, U.S. Provisional Application No. 62/864,891, filed Jun. 21, 2019, entitled "DIGITAL IDENTITY," U.S. Provisional Application No. 62/864,900, filed Jun. 21, 2019, entitled "DIGITAL IDENTITY SIGN-UP," U.S. Provisional Application No. 62/864,906, entitled "DIGITAL IDENTITY SIGN-IN," U.S. Provisional Application No. 62/864,911, entitled "DIGITAL IDENTITY STEP-UP," and U.S. Provisional Application No. 62/864,889, entitled "DIGITAL IDENTITY LOCK," each of which is assigned to the assignee hereof, and each of which are incorporated herein in their entirety by reference for all purposes.

U.S. non-provisional patent application Ser. No. 16/908,435, filed Jun. 22, 2020, now U.S. Pat. No. 11,394,724, issued Jul. 19, 2022 entitled "DIGITAL IDENTITY," U.S. non-provisional patent application Ser. No. 16/908,443, filed Jun. 22, 2020, now U.S. Pat. No. 11,784,995, issued Oct. 10, 2023 entitled "DIGITAL IDENTITY SIGN-UP," U.S. non-provisional patent application Ser. No. 16/908,453, filed Jun. 22, 2020, now U.S. Pat. No. 11,438,331, issued Sep. 6, 2022 entitled "DIGITAL IDENTITY SIGN-IN," and U.S. non-provisional patent application Ser. No. 16/908,460, filed Jun. 22, 2020, now U.S. Pat. No. 11,328,356, issued May 10, 2022 entitled "DIGITAL IDENTITY LOCK," are each incorporated by reference in their entirety for all purposes.

BACKGROUND

Most companies have an online presence today and each has information about each of its users and customers. However, authentication of a user is largely handled piecemeal by each company with little verification of the user by a trusted source. The current way that users are onboarded and authenticated lacks security, consistency, and ease of use for both the companies and the users. Additionally, current methods to perform identity verification online have considerable drawbacks in coverage, validity, and usability.

SUMMARY

Figure 1:
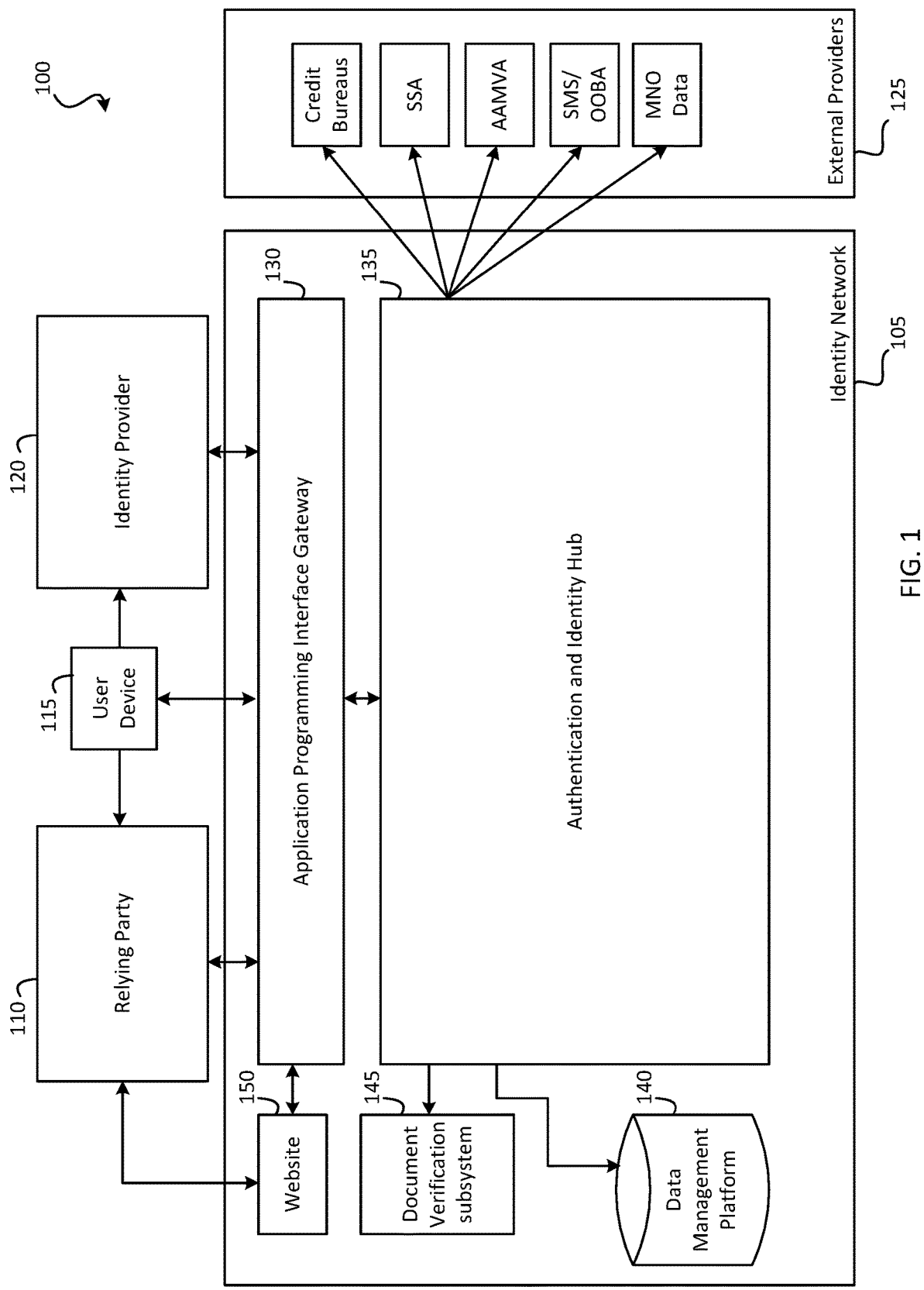
FIG. 1 illustrates an example system for providing an authenticated, universal digital identity for a user, according to an embodiment.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for validating a digital identity of a user with an identity network. The identity network may receive, from a relying party, a device identifier for a user device and a validation request including identity attributes of the user to verify a digital identity of the user. The identity network may identify an identity provider associated with the user's device and launch the identity provider's application using a software development kit integrated into the relying party's application. The identity network may receive confirmation of authentication of the digital identity of the user from the identity provider. The identity network may obtain other identity attribute values for the user's identity attributes, either from a third party, from the identity network, or as stored within the identity network. The identity network may generate a confidence score indicating a confidence that the user is an owner of the digital identity based at least in part on comparing the identity attributes provided by the relying party and as obtained by the identity network. The identity network may transmit the confidence score to the relying party. Other embodiments of this aspect include corresponding computer systems, apparatus, and computer programs recorded on one or more computer storage devices, each configured to perform the actions of the methods.

Implementations may include one or more of the following features. Optionally, the identity network may receive, from the identity provider via the software development kit of the relying party application, consent of the user to provide identification validation to the relying party. The identity network may receive, from the identity provider via the software development kit of the relying party application, a scan of a driver license of the user and a self-taken current picture of the user. The identity network may extract additional identity attributes of the user including the driver license picture of the user. The identity network may generate the confidence score further based at least in part on a comparison of the self-taken current picture of the user and the driver license picture of the user. Optionally, the identity network may obtain, from a third party, a second scan of the driver license of the user. The identity network may extract a second driver license picture of the user from the second scan of the driver license of the user. The identity network may generate the confidence score further based at least in part on a comparison of the second driver license picture of the user with the driver license picture of the user and the self-taken current picture of the user. The identity network may obtain the additional identity attributes by requesting them from one or more third parties. Optionally, the identity network may perform a device check of the user's device based on the device identifier. The identity network may transmit the result of the device check to the identity provider. The identity network may receive, from the identity provider, a detail request and, in response, transmit at least a portion of the validation request to the identity provider. Implementations of the described techniques may include hardware, a method or process, or computer software on a computer-accessible medium.

DETAILED DESCRIPTION

The explosion of online user activity and data over the past decades have resulted in a disparate system in which most online companies have developed their own systems for users to sign-up, sign in, and utilize their services. Authentication of users is often difficult to ensure that online identity theft and other sinister activities are avoided. Further, the process for creation of new accounts and tracking of countless passwords for users is tedious.

To solve the problem of invalid authentication and password security for users, described herein is a system for an authenticated, universal digital identity that a user may use to validate authentication for a relying party activity. For example, an expensive purchase may trigger the relying party to confirm the digital identity of the user.

Users often have a trusted relationship with their banks, and banks are regulated so certain precautions are taken by banks to ensure the user is a legitimate and authenticated user. Banks and other providers that have regulated processes for identifying users may be used to authenticate users with a digital identity authentication and provide information on the users for relying companies by becoming an identity provider in the disclosed identity network. Relying companies, such as insurance companies, retailers, and so forth can enroll with the identity network to gain the benefit of the identity provider authenticating the digital identity of users and customers and providing verified information upon account sign-in for a new customer. The identity network can broker authentication and information exchange using cryptographic technology and other verifiable methods between the relying party and the identity provider. Additional technological value can be provided by the identity network, which can oversee and identify suspicious activity overall for a device or user given their online activities associated with any identity provider, obtain information from various third parties for the relying party to further validate the user, and so forth.

FIG. 1 illustrates an example digital identity system 100 for authenticated, universal digital identities for users. System 100 includes an identity network 105, relying party 110, user device 115, identity provider 120, and external providers 125. Components or functionality described may be combined into fewer components or expanded into more components without departing from the scope of the invention.

Identity network 105 may include a network of one or more computers, such as computing device 600. The identity network 105 may include application programming interface gateway 130, authentication and identity hub 135, data management platform 140, document verification subsystem 145, and website 150. Identity network 105 may include other components or functionality than discussed or functionality may be combined into fewer or more components without departing from the scope of the invention. Identity network 105 provides the functionality to broker authentication and information exchange between the relying party 110 and the identity provider 120 as discussed in more detail herein.

Application programming interface gateway 130 provides a gateway for the relying party 110, user device 115, identity provider 120, and the website to interact with the authentication and identity hub 135. The authentication and identity hub 135 interfaces between various components and collects information needed for identity assertions. For example, authentication and identity hub 135 may collect information from external providers 125 including, for example, credit bureaus, the social security administration, the American association of motor vehicle administrators, and other external providers that utilize out-of-band authentication (e.g., secure message service out-of-band authentication), and/or mobile network operator data. Various data from external providers may be used depending on the request from the relying party 110, which will be described in greater detail with respect to FIG. 2.

Authentication and identity hub 135 also interfaces with the document verification subsystem 145 for verifying documents. The document verification subsystem 145 may be a third party subsystem or may interface with a third party subsystem in some embodiments. The authentication and identity hub 135 may interface with the document verification subsystem 145 using an application programming interface. The document verification subsystem enables the identity network 105 to request a standard identity document from an end user on user device 115. The standard identity document may be, for example, a driver license, state-issued identification, or country-issued passport. The document verification subsystem 145 can validate the document presented by the user is a legitimate document, that the identity attributes match those of the identity provider 120 for the given user, and that the document photo matches the end user holding the document. The document verification subsystem 145 can also verify data submitted by an end user against data found on authoritative documents such as a state issued driver license or a United States Passport, for example. In some embodiments, when a user submits data or information using user device 115, the authentication and identity hub 135 may provide the data to the document verification subsystem 145 in conjunction with information from an external provider 125. The document verification subsystem 145 can extract information from the documents provided from the external providers 125 and compare it to the data the user provided. For example, the user may provide a driver license number, and the document verification subsystem 145 may extract the user's driver license number from the user's driver license obtained from an external provider 125 (e.g., the state department of motor vehicles) and compare the two values to ensure the user entered data is accurate.

Authentication and identity hub 135 also interfaces with data management platform 140. Data management platform 140 can provide, for example, identity reputation scores and/or device reputation information. For example, the identity network 105 may identify based on a common device id (described in more detail with respect to FIG. 4) activity of a device at one or more identity providers 120 and/or one or more relying parties 110. This activity can be modelled and compared to models that may indicate whether the activity the device is engaging in is suspicious. If suspicious activity is detected, new requests may be flagged for the relying party 110 requesting the information or authentication. Similar to device reputation, identity reputation models capture network behavior of a given user to determine inconsistencies that correlate to potential fraud. The identity reputation and/or the device reputation information may be used to generate an identity confidence score used to help a relying party determine if the confidence is sufficient to proceed with the relying party use of the digital identity or if the relying party may instead, for example, require additional authentication information from the user. The authentication and identity hub 135 can interface with the data management platform 140 using an application programming interface.

Website 150 may be an internet interface provided by identity network 105 that a relying party 110 may redirect the end user, for example, to select their identity provider 120 when a request is initiated. Website 150 may redirect the user to their identity provider 120 website or mobile application via a matrix barcode (e.g., a QR code), a deep link, a website link, or via a short message service (SMS) or mobile push notification. In some embodiments, the relying party 110 may include a software development kit from the identity network 105 that is used to redirect the user to the website 150 to select the user's identity provider 120 when a request is initiated.

Authentication and identity hub 135 may communicate digital identity data that is obtained from the identity provider 120 to the relying party 110 when the identity network 105 fulfills an identity assertion. An identity assertion may be an authentication request in which the relying party 110 requests that the identity provider 120 validate or authenticate the digital identity of the user. The authentication request is sent to the identity network 105 from the relying party 110 and forwarded to the identity provider 120 by the identity network 105.

Data management platform 140 is used to provide ledger functionality (e.g., distributed or non-distributed ledger or hyper ledger functionality) to identity network 105. The ledger may store a registered identifier for each user registered to a particular identity provider 120. It may also be used to create a record of instance of the sharing of identity attributes from identity provider 120 to a relying party 110 on behalf of an end user. Each request and response for authentication and digital identity data may be passed through the authentication and identity hub 135 to store every transaction in the ledger.

Digital identity data may be provided from the identity provider 120 to the authentication and identity hub 135. The hub may provide the digital identity information to the relying party 110.

Relying party 110 may be any company that would like to be able to authenticate the digital identity of a user. Examples of relying parties 110 include insurance companies, retailers, travel companies (e.g., airlines, hotels, cruise lines), and the like. While only a single relying party 110 is depicted in FIG. 1 for the sake of simplicity of explanation, any number of relying parties 110 may be included in system 100.

Figure 6:
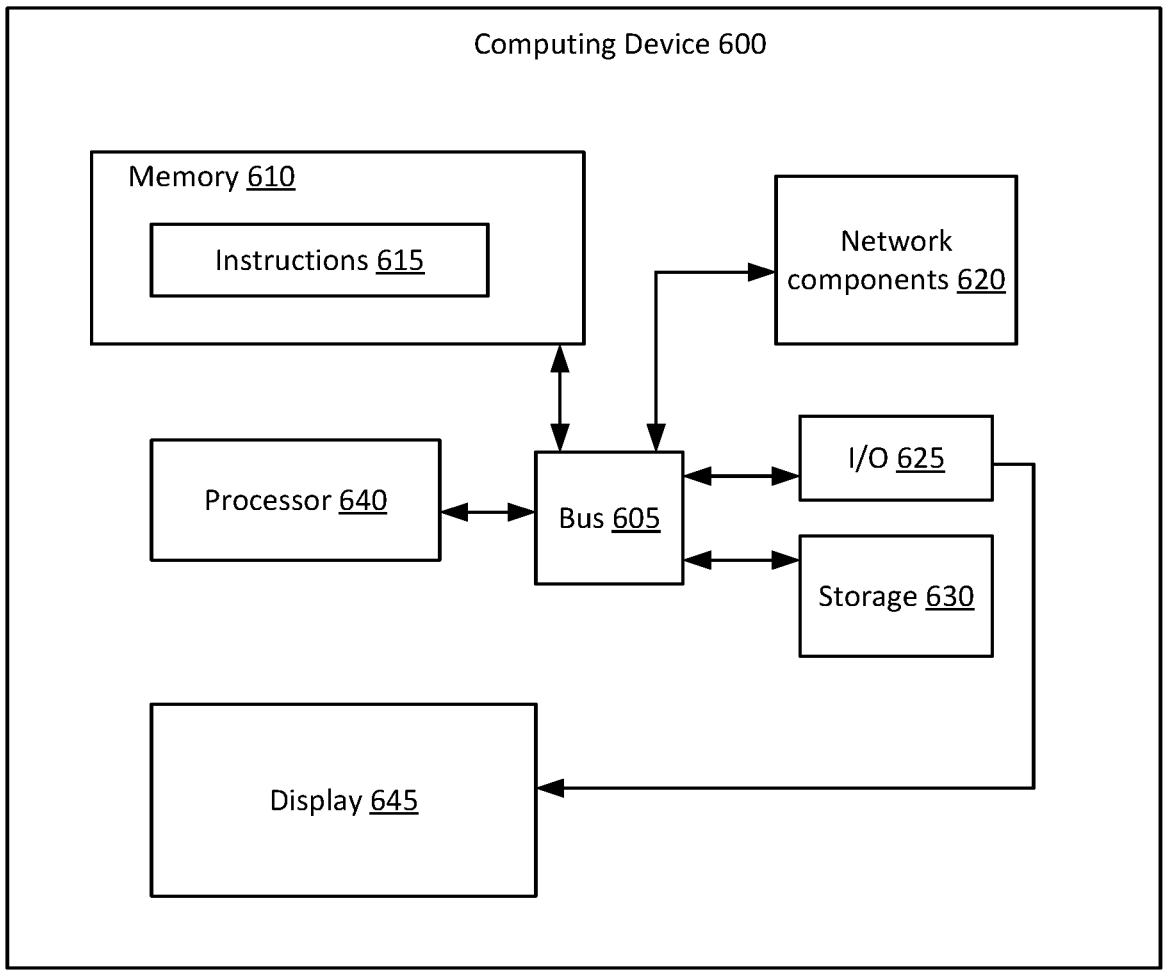
FIG. 6 illustrates an example computer system.

User device 115 may be any suitable computing device, such as computing device 600 as depicted and described with respect to FIG. 6, of a user. For example, user device 115 may be a laptop, smartphone, desktop computer, tablet, smartwatch, and the like. While only a single user device 115 is depicted in FIG. 1 for the sake of simplicity of explanation, any number of user devices 115 may be included in system 100.

Identity provider 120 may be any suitable company that can authenticate a user having user device 115 for relying party 110. Identity provider 120 may include, for example, financial institutions. Identity provider 120 may have detailed information and have verified the identity of the user of user device 115 because, for example, financial institutions are regulated by the government with respect to identifying customers with specificity. While only a single identity provider 120 is depicted in FIG. 1 for the sake of simplicity of explanation, any number of identity providers 120 may be included in system 100.

In use, a user may access a relying party 110 website using the user device 115. For example, the user may wish to initiate a new relationship with the relying party 110 to, for example, become a customer of the relying party 110. The relying party 110 may request digital identity authentication and information for the user of user device 115 from the identity network 105 via website 150. In some embodiments, user device 115 may access a mobile application of relying party 110. The mobile application may access website 150 with an identity assertion. The identity assertion may be a request to authenticate the digital identity of the user and, in some cases, request additional information about the user. In response, the website 150 may provide a list of identity providers 120 for the user to select for authenticating the user's digital identity. The list may include many identity providers 120, and the user should select an identity provider with which the user has a relationship. For example, if the user is a customer of BankA, and BankA is an identity provider in the list, the user may select BankA as the identity provider for authenticating that user's digital identity. If the user has a relationship with multiple identity providers 120, the user may select any one of the identity providers 120 with which the user has a relationship. Once the user selects an identity provider 120, the application programming interface gateway 130 may receive the identity assertion including requested data about the user and the selected identity provider 120 and provide the entire request to the authentication and identity hub 135. The authentication and identity hub 135 may then provide the identity assertion to the identity provider 120. The identity provider 120 can authenticate the digital identity of the user and provide the requested information via the application programming interface gateway 130 to the authentication and identity hub 135. The authentication and identity hub 135 may obtain other information requested by the relying party 110 but not included from the identity provider 120. The authentication and identity hub 135 may request and obtain the information from the external providers 125, for example. Once the information is complete, the authentication and identity hub 135 may provide the information in the identity provider node 145, which provides the information and acknowledgement of the authentication of the user's digital identity to the relying party 110. If the identity provider 120 cannot authenticate the digital identity of the user, the identity provider 120 can provide such failed authentication notice to the authentication and identity hub 135, and the authentication and identity hub 135 can inform the relying party 110 of the failed authentication.

Figure 2:
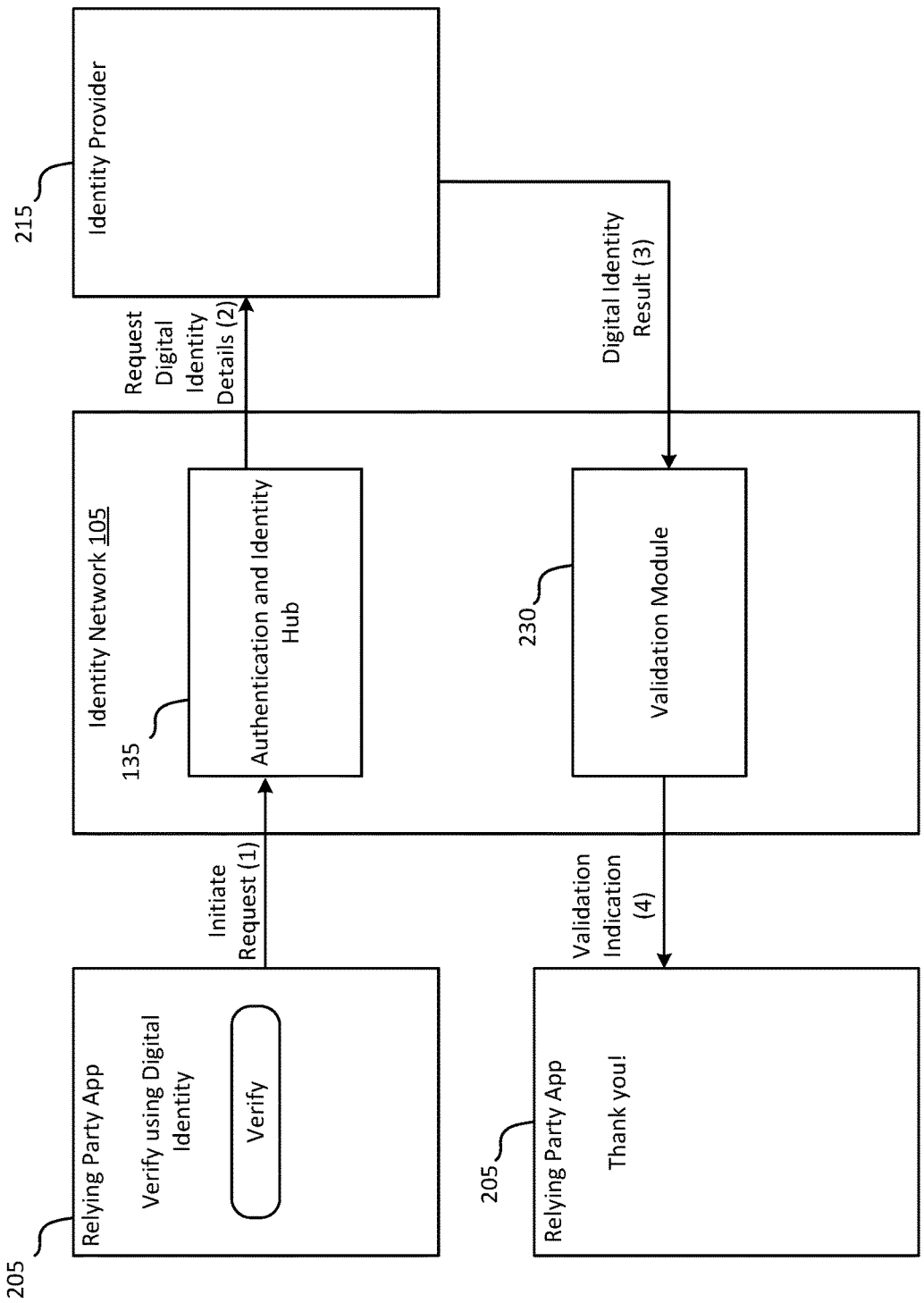
FIG. 2 illustrates an example data information flow using an authenticated, universal digital identity for a user, according to an embodiment.

FIG. 2 illustrates a flow diagram 200 for verifying a digital identity of a user. Relying parties and identity providers are registered with the identity network 105. When a user chooses to use an identity provider to validate the user's digital identity for a relying party, there may be a sign-up process in which the user selects the identity provider to use for validation. The digital identity of the user may be, at least in part, linked to the device used to sign-up and/or validate the user. Once the user is signed up, the user may use the identity provider to continue to validate the user for future interactions with the relying party. For example, if the user chooses to modify his or her account with the relying party or make a large purchase with the relying party, the relying party may wish to validate that the user matches the digital identity of the user to help ensure the transaction is valid. In such cases, the user may be accessing the relying party application 205 to, for example, make a large purchase or request an account change. The relying party application 205 provides an option to the user to verify themselves using their digital identity. When the user selects that verification option, the request is initiated to the identity network 105 (Initiate Request (1)). The request can include, for example, the device identifier for the device the user is using to access the relying party application 205. The request also includes specific identity attributes of the user that the user may enter to request validation at the relying party application. The identity attributes may include, for example, the user's name, address, social security number, bank account balance, and so forth.

The identity network 105 may use the authentication and identity hub 135 to identify a token that correlates the identity provider 215 and the user. For example, when the user initially signs up and selects identity provider 215 for authentication, a token may be generated or provided that is saved by the authentication and identity hub 135 for use upon later authentication requests. For example, when the user signs up and requests an identity provider 120 to authenticate the user, a token may be received and saved in the authentication and identity hub 135 for the user/identity provider relationship so that upon later requests to authenticate, the token can be identified in the authentication and identity hub 135 and the same identity provider used. In some embodiments, the token is provided by the user with the selection of the identity provider, in some embodiments, the identity provider may provide the token upon first request by the identity network 105 to authenticate the user with the identity provider, or in some embodiments, the identity network may generate a token for storing the user/identity provider relationship. In some embodiments, the device identifier may be used to look up the registered identity provider 215 to use to validate the digital identity of the user. The correlation between the identity provider 215 and the device identifier may be created during the sign-up process and saved in the authentication and identity hub 135 for future transactions.

The identity network 105, using the identified identity provider 215 requests digital identity details (Request Digital Identity Details (2)). For example, the user associated with the digital identity has many attributes including, for example, a name, a telephone number, a social security number, and the like. The identity provider 215 can provide the digital identity result to the identity network 105 (Digital Identity Result (3)). The digital identity result can include identity attributes for the digital identity of the user. The identity attributes provided by the identity provider 215 can include, for example, the user's name, address, social security number, bank account number, bank account balance, and so forth.

The identity network 105 can validate the information in the initial request using the digital identity result. For example, the identity attributes provided by the relying party application 205 in the initial request can be compared with the identity attributes provided by the identity provider 215 in the digital identity result. In addition, the user may provide, via the identity provider application (not shown) a scan of the user's driver license and a self-taken current photo (i.e., a selfie). The validation module 230 may validate that the self-taken current photo is substantially similar to the picture of the driver on the driver license. In some embodiments, the validation module 230 may request information from a third party to further validate the user. For example, the validation module 230 may request a scan or copy of the user's driver license photo from the department of motor vehicles for the state in which the user has a driver license. The validation module 230 may then compare the photo provided by the department of motor vehicle to the scanned copy and the selfie provided by the user. Based at least in part on these comparisons, and in some embodiments based on other current activity of the user device as compared with historical behavior of the user on the user device, the identity network 105 generates a confidence score that the user of the user device matches the digital identity of associated with the user device. The identity network 105 can provide the confidence score (also called a reputation score, which may, for example, be a match/no match indication) to the relying party (Validation Indication (4)). The relying party can then determine, based on the score, whether to proceed with allowing the user to complete the transaction or, for example, request additional verification from the user to confirm the user is valid.

Figure 3:
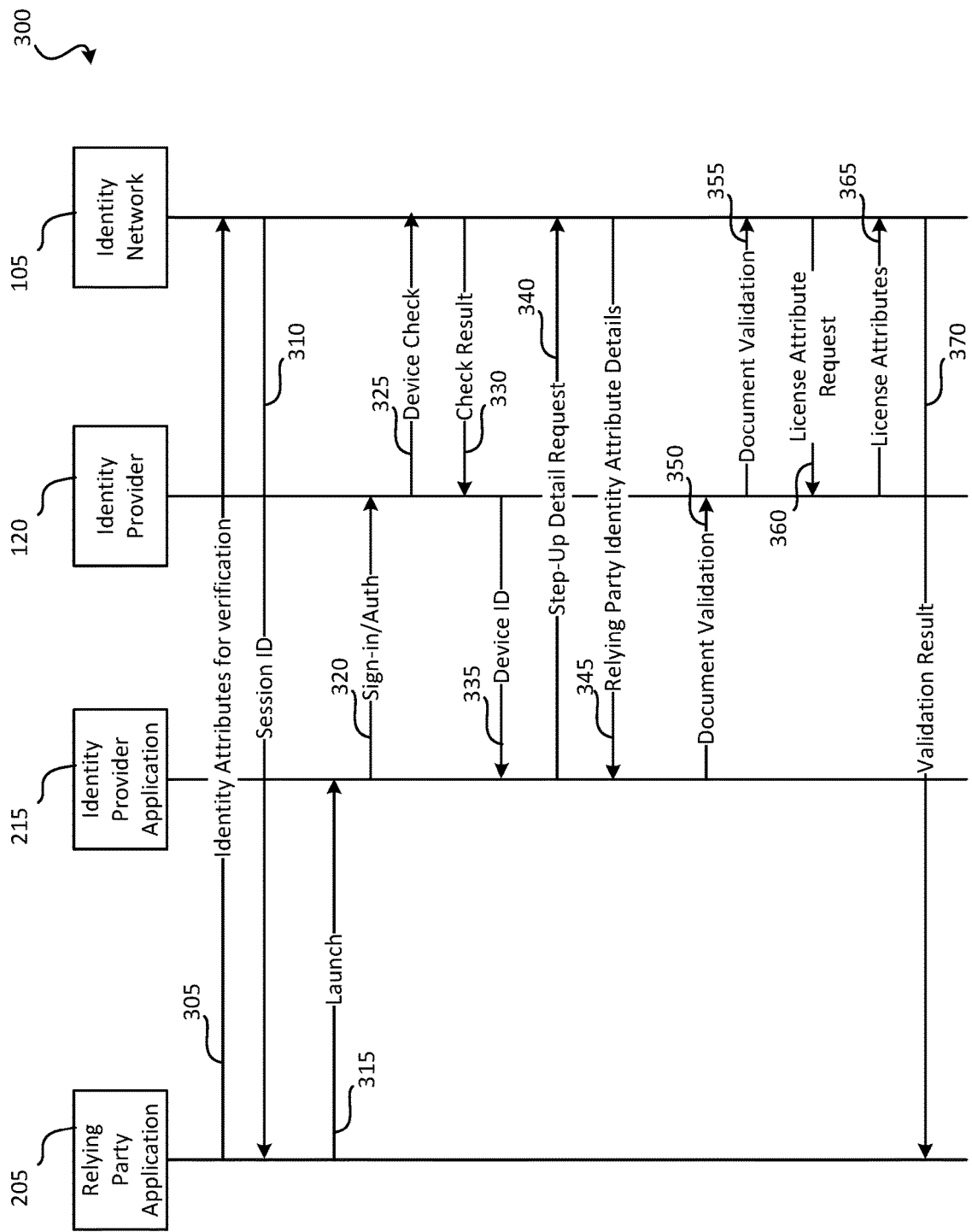
FIG. 3 illustrates an example swim diagram for a step-up flow according to an embodiment.
Figure 4:
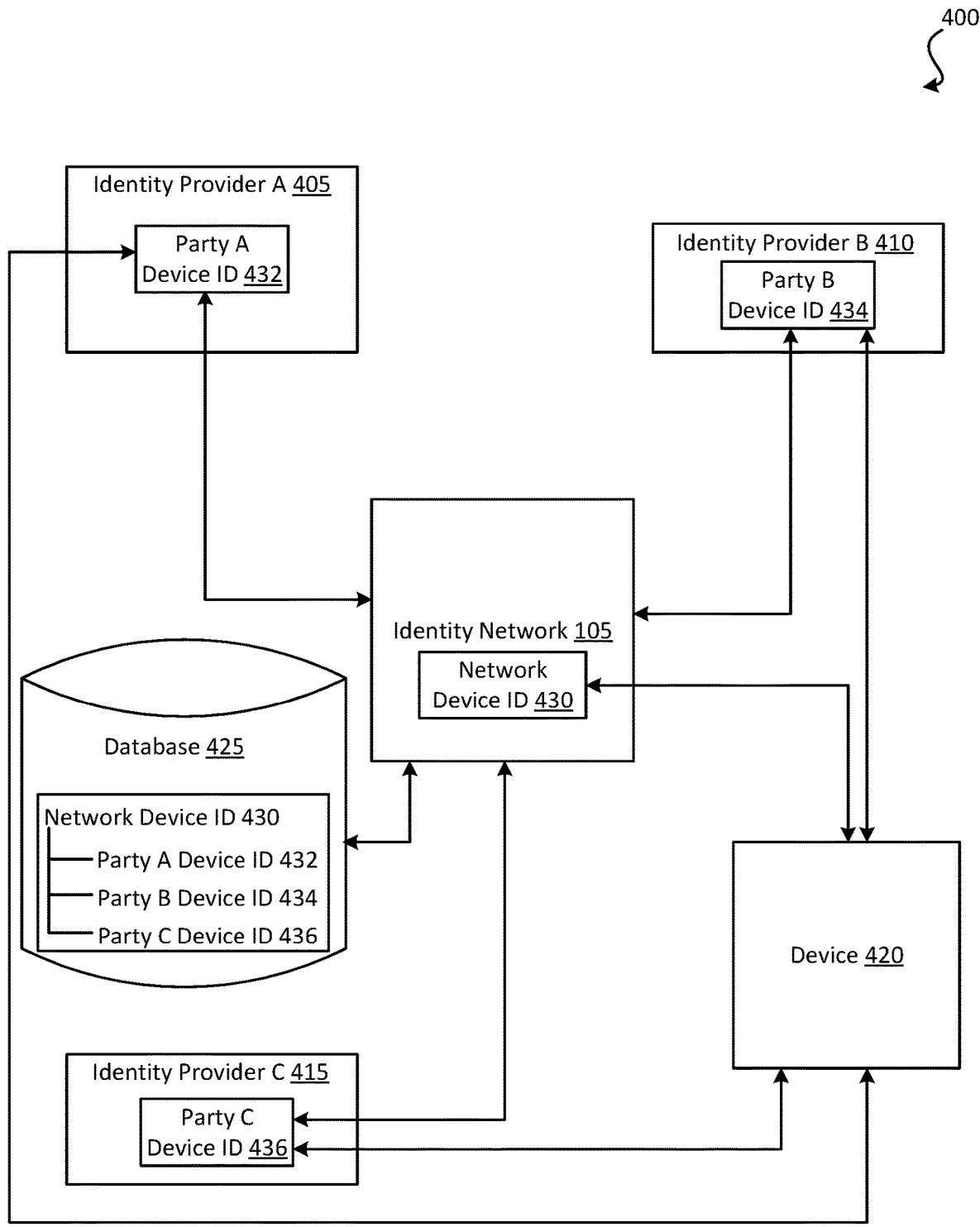
FIG. 4 illustrates an example common identifier data flow for identifying suspicious activity of a digital identity, according to an embodiment.

FIG. 3 illustrates a swim diagram 300 for message exchanges between various components during a digital identity verification. The swim diagram 300 includes components of the system including relying party application 205, identity provider application 215, identity provider 120, and identity network 105. A user of a user device having a digital identity associated with it may access a relying party application 205. The user may, for example, wish to make an account change. Before allowing the user to change the account, the relying party may wish to validate the user to ensure that the user is valid to make the requested change. The relying party application can provide an option to the user to validate using the user's digital identity. The user may have previously engaged in validation using a digital identity with an identity provider 120 through the identity network 105. Accordingly, when the user selects the option in the relying party application 205 to validate using the user's digital identity, the relying party application 205 can send identity attributes for verification to the identity network 105 as shown by arrow 305. For example, the user may enter various identity attribute values for verification as requested by the relying party application 205. The relying party application 205 can include the identity attribute values the user entered for validation. The communications between the relying party application 205, identity network 105, identity provider 120, and/or identity provider application 215 may be encrypted to ensure security for the user's information. In addition, a device identifier of the user's device used to access the relying party application 205 can be provided to the identity network 105. The device identifier may be a unique identifier that is set up for use for the digital identity verification. The device identifier may be set up when the user signs up for using digital identity with the relying party. FIG. 4 provides additional information for the use of the device identifier. In response to the request for validation, the identity network 105 can provide a session identifier to the relying party application 205 as shown by arrow 310. The response also may include the device identifier that is associated with along with a link to the identity provider application 215. The link may be a redirect link if the user is using a web browser to access the relying party application 205. If the user is using a mobile application version of the relying party application 205, the link will be a deep link. The response may be provided using a software development kit from the identity network 105 that is incorporated into the relying party application. As such, the relying party application may have access to certain portions of the response, such as the session identifier, without having direct access to, for example, the deep link.

The relying party application 205, using the software development kit from the identity network 105, can use the link to launch the identity provider application 215 as shown by arrow 315. The user will then login to the identity provider application 215 when the identity provider application 215 launches as shown by arrow 320. The login process will be the typical process for the user of providing the user's credentials to the identity provider application 215 such as, for example, a biometric login (e.g., fingerprint, faceprint, iris scan, or the like), a username and password, or the like. The login to the identity provider 120 may serve to validate the authentication of the user by the identity provider 120.

The identity provider 120, as part of the login process, can request a device check from the identity network 105 as shown by arrow 325. The device check can include, for example, the device identifier of the user's device as provided from the relying party application 205 when the identity provider application 215 is launched. The relying party application 205 can also provide to the identity provider application 215 on launch the session identifier provided from the identity network 105. The device check can include the session identifier, which the identity network 105 can use to correlate the device check request with the initial verification request.

The identity network may check the device identifier provided by the identity provider 120 against a saved device identifier to ensure that the device matches and correlates with the original identity request. In some embodiments, the device check may further include validating activity associated with the device identifier to identify suspicious activity. For example, the request may be for making a large purchase, and this activity as well as previous activity saved that is associated with the device identifier may be compared to a model to determine whether the activity is suspicious. An indication that the activity seems normal or suspicious may be provided with the result of the device check to the identity provider. As shown by arrow 330, the identity network 105 can provide the check result to the identity provider 120. The identity provider can, in turn, provide the device identifier to the identity provider application 215, confirming the identity provider application 215 can proceed, as shown by arrow 335. If the device check indicates suspicious activity, the identity provider 120 may halt the process in some embodiments. In some embodiments, the suspicious activity may be incorporated into the validation result provided by the identity network 105 at arrow 370 as described in more detail below.

The identity provider application 215 may be used to scan a QR code or enter a code provided to the user by the relying party application from the identity provider 120 via the software development kit that prompts the identity provider application 215 to request the step-up detail request from the identity network 105 as shown by arrow 340. Stated differently, the user, upon successful login of the identity provider application 215 through the deep link launch, may be provided with a code such as a QR code to scan or a validation code. The user may enter the code into a given screen in the relying party application 205 or be able to scan the QR code such that the relying party application 205 receives the scan of the QR code. This entry or scan may invoke the step-up detail request shown by arrow 340. The step-up detail request is a request for details of the initial validation request from the relying party application 205. The step-up detail request can include a request for the identity attributes the user provided to the identity network 105, for example. The identity network 105 can provide the requested details as shown by arrow 345.

Once the requested details are known to the identity provider application 215, the identity provider application 215 can request consent from the user, via the identity provider application 215 that was launched through the deep link sent to the software development kit integrated into the relying party application 205. The consent request can request consent to provide the requested details to the relying party application 205. The user can provide consent or deny consent. If consent is denied, the entire process aborts. If the user provides consent, the identity provider application 215 then requests details from the user including, for example, a scan of the user's driver license and a self-taken current photo (i.e., a selfie). The self-taken current photo can be required to capture on the spot to ensure the photo is of the user controlling the user device. The identity provider application 215 can request document validation from the identity provider 120 as shown by arrow 350. The identity provider 120 can request the document validation from the identity network 105 as shown by arrow 355. The document request can include the scan of the driver license and self-taken photo. The identity network 105 can validate the driver license and attributes. The identity network 105 can extract the information from the scan of the driver license, including the driver license photo. The identity network 105 can request information from various identity providers 120 including from the selected identity provider to determine the identity attribute values associated with the digital identity of the user. For example, the identity network 105 can send a license attribute request to the identity provider 120 as shown by arrow 360. These attributes can include the user's name, address, height, weight, and so forth. In some embodiments, the department of motor vehicles may be an identity provider 120, and the identity network 105 can send a request for the driver license to the department of motor vehicles. The identity network 105 can obtain the requested license attributes as shown by arrow 365.

Once the identity network 105 receives the attributes, the identity network 105 validates the digital identity of the user. The identity network 105 can generate a confidence score or, for example, provide a binary match/no match response to the relying party application 205 as shown by arrow 370. The identity network 105 validates the digital identity (e.g., generates the confidence score) at least in part by comparing the self-taken photo with the driver license photo. The identity network 105 can also compare the driver license scan from the identity provider application 215 with a copy of the driver license received from the department of motor vehicles in some embodiments. The identity attributes that the identity network 105 received from the identity provider 120 can also be compared with the identity attributes provided by the user in the relying party application 205 as included in the initial request for verification as well. In addition, the identity network 105 may use the device identifier to compare the user's current activity with the user's historical identity that may indicate suspicious activity of the user. Note that while driver license information is described for the above example of verification, other information about the user may be requested and confirmed including the user's name, birth date, social security number, address, mother maiden name, spouse name, and the like. Further, identity providers 120 can be queried for the information to compare against to calculate the confidence score. For example, the social security administration, credit reporting bureaus, banks, and other sources may be identity providers that can provide information about the user for comparison to confirm the user's digital identity.

The relying party application 205 can make a determination on whether to proceed with the user's requested transaction (e.g., to change the user's account or make a large purchase) based at least in part on the confidence score. If the confidence score is low or, if a binary match/no match response is provided, if the response is no match, the relying party may request additional authentication from the user (e.g., enhanced questioning for things known only to the user such as the user's mother's maiden name, youngest child's middle name, or the like) or may deny the request.

FIG. 4 illustrates a system 400 showing common device identifiers for a device 420, which can be used by the identity network 105 to identify, for example, suspicious activity of the device 420. The identity network 105 may have access to information about transactions of device 420 across many identity providers while each individual identity provider (405, 410, and 415) only has access to interactions with that identity provider. The identity network 105 has a more universal view that can be used as a benefit to both the identity providers and the user of the device 420. System 400 includes identity provider A 405, authenticating party B 410, identity provider C 415, device 420, identity network 105, and database 425. While only three identity providers are depicted in FIG. 4, any number of identity providers may be included in system 400. Further, while a single device 420 is depicted, system 400 may include any number of devices. Additionally, while identity providers are listed, relying parties may also be included in addition to identity providers.

Identity providers A 405, B 410, and C 415 may each be a company subscribed to the identity network such as a relying party (e.g., relying party 110) or an identity provider (e.g., identity provider 120). For each identity provider 405, 410, and 415, the device 420 may have a device ID. For example, identity provider A 405 has assigned device 420 a locally unique identifier Party A Device ID 432. A different device will have a different device ID with identity provider A 405 than party A device ID 432. Similarly, identity provider B 410 may have assigned device 420 party B device ID 434, and identity provider C 415 may have assigned device 420 party C device ID 436. In this way, any activity performed between device 420 and identity provider A 405 will include party A device ID 432, any activity performed between device 420 and identity provider B 410 will include party B device ID 434, and any activity performed between device 420 and identity provider C 415 will include party C device ID 436.

Identity network 105 also has a unique device ID assigned to device 420. Network device ID 430 is the device ID assigned to device 420 by identity network 105. Any activity performed between identity network 105 and device 420 will include network device ID 430. Further, identity network 105 stores information in database 425 that links party A device ID 432, party B device ID 434, and party C device ID 436 with network device ID 430 so that identity network 105 may identify all known activity of device 420 to that single device 420.

In this way, when identity provider A 405 communicates with identity network 105 about an interaction with device 420, the information can include party A device ID 432. Identity network 105 can access database 425 to identify network device ID 430 based on the received party A device ID 432.

Identity network 105 may develop models of suspicious and normal activity for various users based on demographic and/or other data. Because identity network 105 can review all activity of device 420 with identity providers, the suspicious and normal activity models can be applied to the activity of device 420 to determine whether the device 420 activity is suspicious. If suspicious, identity network 105 can send an alert to the identity provider that may be interacting with device 420 currently or previously. Perhaps, for example, device 420 is a user's smartphone. If the user's smartphone is stolen and the thief accesses the user's accounts to make excessive purchases or transfer money out of the user's bank accounts, identity network 105 may identify the suspicious activity and notify identity providers that may be interacting with device 420. This not only protects the identity providers but the user as well from this type of criminal activity.

Figure 5:
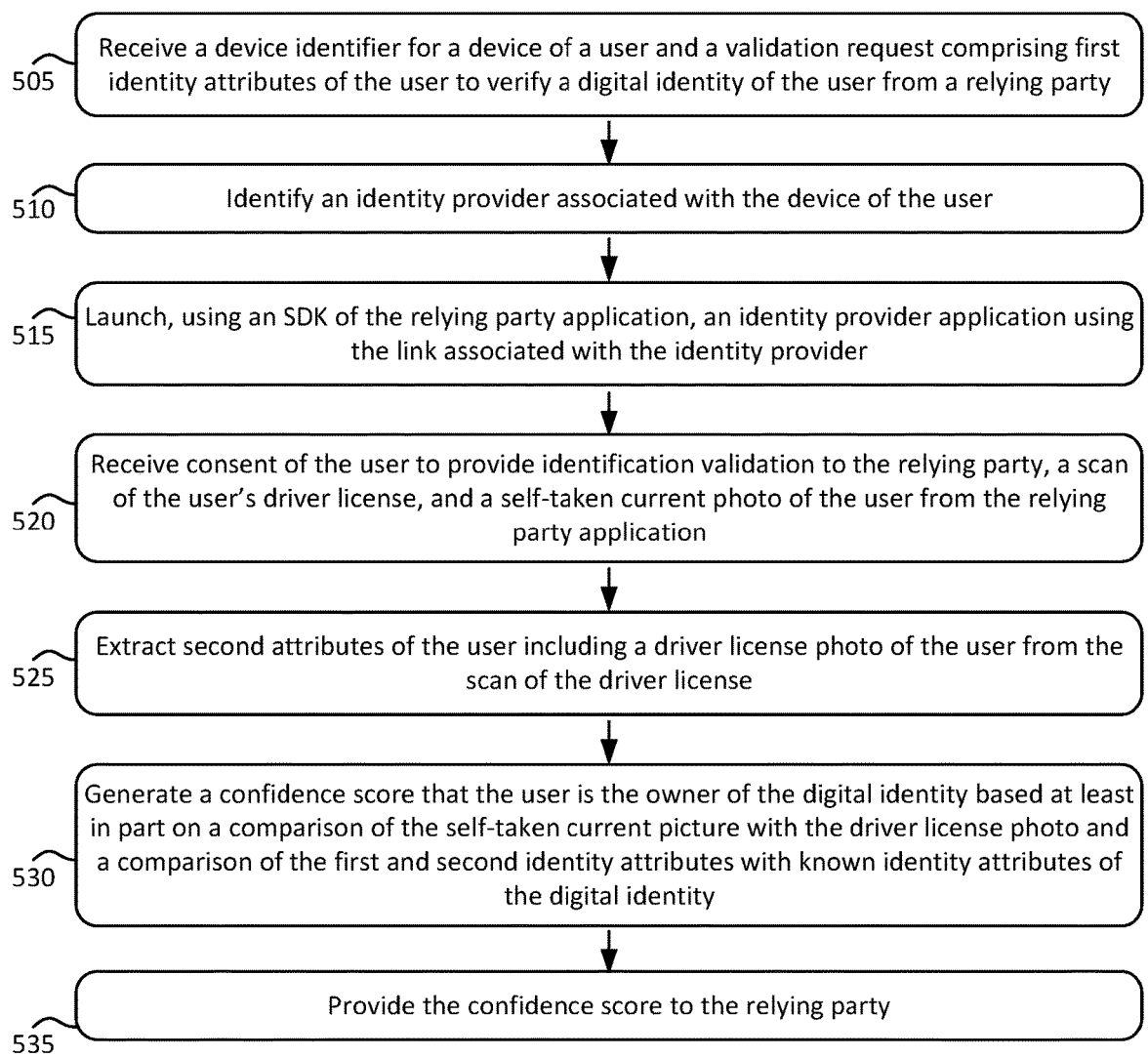
FIG. 5 illustrates an example method for providing an authenticated, universal digital identity for a user, according to an embodiment.

FIG. 5 illustrates a method 500 for validating the digital identity of a user. Method 500 may be performed by, for example, identity network 105. The identity network may receive a device identifier for a device of a user and validation request including first identity attributes of the user to verify a digital identity of the user from a relying party at step 505. The user may initially access a relying party application (e.g., relying party application 205), and the relying party application may request additional validation of the user, providing the user the option to use a digital identity verified by the user's identity provider. Upon selection of digital identity verification from the user, the relying party application can send the request to the identity network that includes the device identifier and identity attributes provided by the user for verification.

At step 510, the identity network can identify the identity provider associated with the device of the user. For example, the user may have signed up with the relying party using a digital identity and, at that time, selected an identity provider that is used for future transactions such as this validation request. The identity provider can provide the identity provider link and a session identifier for this validation request to the relying party application.

At step 515, the relying party application, which uses an identity network software development kit ("SDK") obtained when the relying party became a registered relying party with the identity network, can launch the identity provider application using the link provided by the identity network.

At step 520, the user will see the launched identity provider application and will login to the identity provider application. After authenticating the user, the identity provider may request a code or other information to obtain the details of the validation request. The user may enter the code or scan a code from the relying party application. The identity provider can request the details from the identity network including what identity attributes the relying party is asking for. Upon receiving that information, the identity provider application can display a consent to the user that requests consent from the user to validate the digital identity and provide to the relying party the identity attributes that the relying party is requesting. The user can consent or deny consent. If the user denies consent, the method 500 ends. If the user provides consent, the identity provider application may request a scan of the user's driver license and an instantly captured at that moment self-taken photo. The identity provider can provide the confirmation of consent, the self-taken photo and the scan of the user's driver license to the identity network at step 520. The identity network can extract attribute information from the driver license, including the driver license photo at step 525. Any suitable extraction method can be used to extract the information from the driver license.

At step 530, the identity network can generate a confidence score that the user using the user device is the owner of the digital identity. The confidence score can be based, at least in part, on various comparisons. For example, the identity network can compare the self-taken photo and the driver license photo to determine whether the photos are substantially similar. In some embodiments, the identity network can obtain a copy of the user's driver license from the department of motor vehicles to compare the scan of the driver license and information on it with the driver license obtained from the department of motor vehicles. The identity network can also review, using the device identifier of the user's device, whether current activity of the user's device with this and other relying parties and identity providers is suspicious or typical given the user device historical data. Further, the identity network can request the identity provider provide attribute information for the attributes that the initial request included that were provided by the user at the relying party application. The identity provider can provide the attribute values for the user, and the identity network can compare the values provided by the user with the values provided by the identity provider. If the values match, the confidence score will be higher than if many of the values do not match.

At step 535, the identity network can provide the confidence score along with the device identifier and session identifier to the relying party application. The relying party application may then, depending on the confidence score and/or whether the identity network indicated that the user of the user device matches the digital identity, proceed with the user in the relying party application. For example, the user's request may be denied, more information may be requested of the user, or the relying party may proceed with the user's request. How the relying party application uses the confidence score is within the discretion of the relying party.

FIG. 6 illustrates a block diagram of an example computer system 600 usable for performing image analysis, normalization, and display. The computing device 600 can be or include, for example, a laptop computer, desktop computer, tablet, e-reader, smart phone or mobile device, smart watch, personal data assistant (PDA), or other electronic device.

The computing device 600 can include a processor 640 interfaced with other hardware via a bus 605. A memory 610, which can include any suitable tangible (and non-transitory) computer readable medium, such as RAM, ROM, EEPROM, or the like, can embody program components (e.g., instructions 615) that configure operation of the computing device 600. In some examples, the computing device 600 can include input/output ("I/O") interface components 625 (e.g., for interfacing with a display 645, keyboard, or mouse) and additional storage 630.

The computing device 600 can include network components 620. Network components 620 can represent one or more of any components that facilitate a network connection. In some examples, the network components 620 can facilitate a wireless connection and include wireless interfaces such as IEEE 802.11, Bluetooth, or radio interfaces for accessing cellular telephone networks (e.g., a transceiver/antenna for accessing CDMA, GSM, UMTS, or other mobile communications network). In other examples, the network components 620 can be wired and can include interfaces such as Ethernet, USB, or IEEE 1394.

Although FIG. 6 depicts a single computing device 600 with a single processor 640, the system can include any number of computing devices 600 and any number of processors 640. For example, multiple computing devices 600 or multiple processors 640 can be distributed over a wired or wireless network (e.g., a Wide Area Network, Local Area Network, or the Internet). The multiple computing devices 600 or multiple processors 640 can perform any of the steps of the present disclosure individually or in coordination with one another.

Each of the instructions, calculations, or operations described herein may be performed using a computer or other processor having hardware, software, and/or firmware. The various method steps may be performed by modules, and the modules may comprise any of a wide variety of digital and/or analog data processing hardware and/or software arranged to perform the method steps described herein. The modules optionally comprising data processing hardware adapted to perform one or more of these steps by having appropriate machine programming code associated therewith, the modules for two or more steps (or portions of two or more steps) being integrated into a single processor board or separated into different processor boards in any of a wide variety of integrated and/or distributed processing architectures. These methods and systems will often employ a tangible media embodying machine-readable code with instructions for performing the method steps described above. Suitable tangible media may comprise a memory (including a volatile memory and/or a non-volatile memory), a storage media (such as a magnetic recording on a floppy disk, a hard disk, a tape, or the like; on an optical memory such as a CD, a CD-R/W, a CD-ROM, a DVD, or the like; or any other digital or analog storage media), or the like. The instructions or operations may be stored in the memory and executed by the processor, which causes the processor to perform the instructions or operations described.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. In certain cases, method steps or operations may be performed or executed in differing order, or operations may be added, deleted, or modified. It can be appreciated that, in certain aspects of the invention, a single component may be replaced by multiple components, and multiple components may be replaced by a single component, to provide an element or structure or to perform a given function or functions. Except where such substitution would not be operative to practice certain embodiments of the invention, such substitution is considered within the scope of the invention.

It is to be understood that the figures and descriptions of embodiments of the invention have been simplified to illustrate elements that are relevant for a clear understanding of the invention. Those of ordinary skill in the art will recognize, however, that these and other elements may be desirable. However, because such elements are well known in the art, and because they do not facilitate a better understanding of the invention, a discussion of such elements is not provided herein. It should be appreciated that the figures are presented for illustrative purposes and not as construction drawings. Omitted details and modifications or alternative embodiments are within the purview of persons of ordinary skill in the art.

It can be appreciated that, in certain aspects of the invention, a single component may be replaced by multiple components, and multiple components may be replaced by a single component, to provide an element or structure or to perform a given function or functions. Except where such substitution would not be operative to practice certain embodiments of the invention, such substitution is considered within the scope of the invention.

The examples presented herein are intended to illustrate potential and specific implementations of the invention. It can be appreciated that the examples are intended primarily for purposes of illustration of the invention for those skilled in the art. There may be variations to these diagrams or the operations described herein without departing from the spirit of the invention. For instance, in certain cases, method steps or operations may be performed or executed in differing order, or operations may be added, deleted, or modified.

Furthermore, whereas particular embodiments of the invention have been described herein for the purpose of illustrating the invention and not for the purpose of limiting the same, it will be appreciated by those of ordinary skill in the art that numerous variations of the details, materials and arrangement of elements, steps, structures, and/or parts may be made within the principle and scope of the invention without departing from the invention as described in the claims.

All patents, patent publications, patent applications, journal articles, books, technical references, and the like discussed in the instant disclosure are incorporated herein by reference in their entirety for all purposes.

What is claimed is:

1. A method for validating a digital identity of a user, comprising:
    receiving, at an identity network from a relying party, an identity validation request to validate a digital identity of the user;
    providing, from the identity network to the relying party, a link associated with an identity provider application based on the identity validation request;
    receiving, at the identity network from an identity provider associated with the identity provider application, a confirmation that the user has successfully accessed the identity provider application via the link;
    after receiving the confirmation, receiving, at the identity network from the identity provider, an attribute validation request to validate identity attributes of the user, wherein the attribute validation request includes a plurality of identity attributes of the user; and
    validating, by the identity network, the digital identity of the user based on the plurality of identity attributes.

2. The method of claim 1, wherein validating the digital identity of the user includes comparing, by the identity network, a first identity attribute of the plurality of identity attributes to a second identity attribute of the plurality of identity attributes.

3. The method of claim 1, further comprising receiving, at the identity network, a first identity attribute from a third-party device, wherein validating the digital identity of the user includes comparing the first identity attribute with a second identity attribute of the plurality of identity attributes.

4. The method of claim 1, wherein:
    the identity validation request includes a second identity attribute; and
    validating the digital identity of the user is based on the plurality of identity attributes and the second identity attribute.

5. The method of claim 1,
    wherein the attribute validation request includes a document, and
    the method further comprises extracting, by the identity network, a first identity attribute based on the document, wherein validating the digital identity of the user is based on the plurality of identity attributes and the first identity attribute.

6. The method of claim 1, further comprising, prior to receiving the confirmation:
    receiving, at the identity network from the identity provider, a device check request, wherein the device check request includes a first device identifier associated with a user device of the user;
    generating, by the identity network, a device check result by comparing the first device identifier and a second device identifier associated with the user device of the user that was previously saved by the identity network; and
    providing, by the identity network, the device check result to the identity provider.

7. The method of claim 6,
    further comprising:
        in response to receiving the identity validation request, providing, from the identity network to the relying party, a first session identifier associated with the identity validation request; and
        storing, by the identity network, the first session identifier in a database,
    wherein:
        the device check includes a second session identifier; and
        generating the device check result includes comparing the first session and the second session identifier.

8. A system, comprising:
    one or more computing devices; and
    memory storing instructions, the instructions being executable by the one or more computing devices, wherein the one or more computing devices are configured to perform a method, comprising:
        receive, at an identity network from a relying party, an identity validation request to validate a digital identity of a user;
        provide, from the identity network to the relying party, a link associated with an identity provider application based on the identity validation request;
        receive, at the identity network from an identity provider associated with the identity provider application, a confirmation that the user has successfully accessed the identity provider application via the link;
        after receiving the confirmation, receive, at the identity network from the identity provider, an attribute validation request to validate identity attributes of the user, wherein the attribute validation request includes a plurality of identity attributes of the user; and
        validating, by the identity network, the digital identity of the user based on the plurality of identity attributes.

9. The system of claim 8, wherein validating the digital identity of the user includes comparing, by the identity network, a first identity attribute of the plurality of identity attributes to a second identity attribute of the plurality of identity attributes.

10. The system of claim 8, further comprising receiving, at the identity network, a first identity attribute from a third-party device, wherein validating the digital identity of the user includes comparing the first identity attribute with a second identity attribute of the plurality of identity attributes.

11. The system of claim 8, wherein:
    the identity validation request includes a second identity attribute; and
    validating the digital identity of the user is based on the plurality of identity attributes and the second identity attribute.

12. The system of claim 8,
wherein the attribute validation request includes a document, and
the method further comprises extracting, by the identity network, a first identity attribute based on the document, wherein validating the digital identity of the user is based on the plurality of identity attributes and the first identity attribute.

13. The system of claim 8, further comprising, prior to receiving the confirmation:
receiving, at the identity network from the identity provider, a device check request, wherein the device check request includes a first device identifier associated with a user device of the user;
generating, by the identity network, a device check result by comparing the first device identifier and a second device identifier associated with the user device of the user that was previously saved by the identity network; and
providing, by the identity network, the device check result to the identity provider.

14. The system of claim 13,
further comprising:
in response to receiving the identity validation request, providing, from the identity network to the relying party, a first session identifier associated with the identity validation request; and
storing, by the identity network, the first session identifier in a database,
wherein:
the device check includes a second session identifier; and
generating the device check result includes comparing the first session and the second session identifier.

15. A non-transitory computing-device readable storage medium on which computing-device readable instructions of a program are stored, the instructions, when executed by one or more computing devices, causing the one or more computing devices to perform a method, comprising:
receiving, at an identity network from a relying party, an identity validation request to validate a digital identity of a user;
providing, from the identity network to the relying party, a link associated with an identity provider application based on the identity validation request;
receiving, at the identity network from an identity provider associated with the identity provider application, a confirmation that the user has successfully accessed the identity provider application via the link;
after receiving the confirmation, receiving, at the identity network from the identity provider, an attribute validation request to validate identity attributes of the user, wherein the attribute validation request includes a plurality of identity attributes of the user; and
validating, by the identity network, the digital identity of the user based on the plurality of identity attributes.

16. The non-transitory computing-device readable storage medium of claim 15, wherein validating the digital identity of the user includes comparing, by the identity network, a first identity attribute of the plurality of identity attributes to a second identity attribute of the plurality of identity attributes.

17. The non-transitory computing-device readable storage medium of claim 15, further comprising receiving, at the identity network, a first identity attribute from a third-party device, wherein validating the digital identity of the user includes comparing the first identity attribute with a second identity attribute of the plurality of identity attributes.

18. The non-transitory computing-device readable storage medium of claim 15, wherein:
the identity validation request includes a second identity attribute; and
validating the digital identity of the user is based on the plurality of identity attributes and the second identity attribute.

19. The non-transitory computing-device readable storage medium of claim 15,
wherein the attribute validation request includes a document, and
the method further comprises extracting, by the identity network, a first identity attribute based on the document, wherein validating the digital identity of the user is based on the plurality of identity attributes and the first identity attribute.

20. The non-transitory computing-device readable storage medium of claim 15, further comprising, prior to receiving the confirmation:
receiving, at the identity network from the identity provider, a device check request, wherein the device check request includes a first device identifier associated with a user device of the user;
generating, by the identity network, a device check result by comparing the device first identifier and a second device identifier associated with the user device of the user that was previously saved by the identity network; and
providing, by the identity network, the device check result to the identity provider.

* * * * *